Sept. 25, 1945.   J. H. NELSON ET AL   2,385,459
ELECTRIC BRAKE MECHANISM
Filed March 29, 1943   3 Sheets-Sheet 3

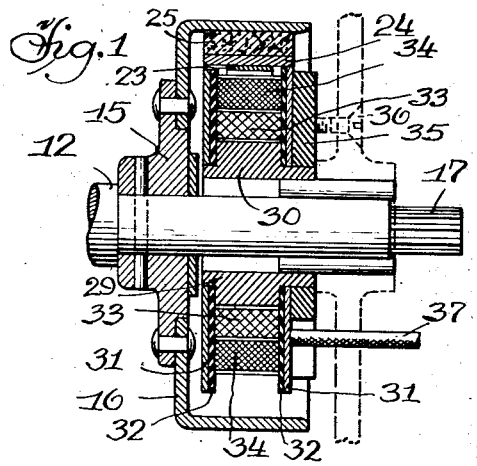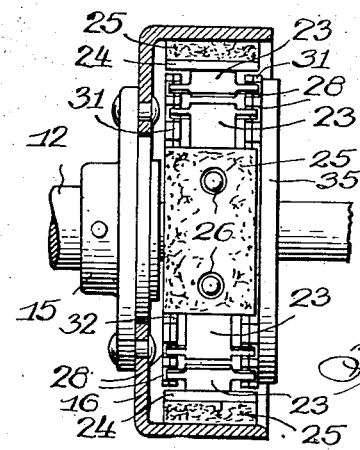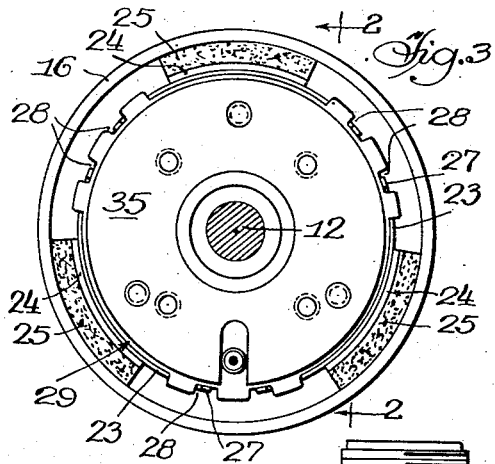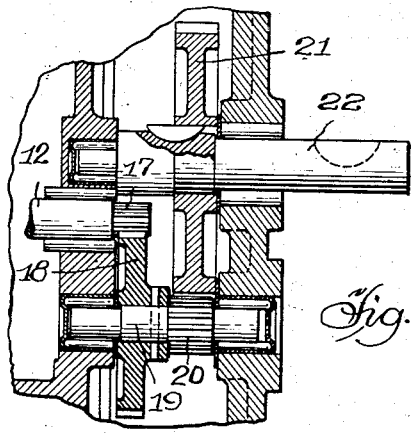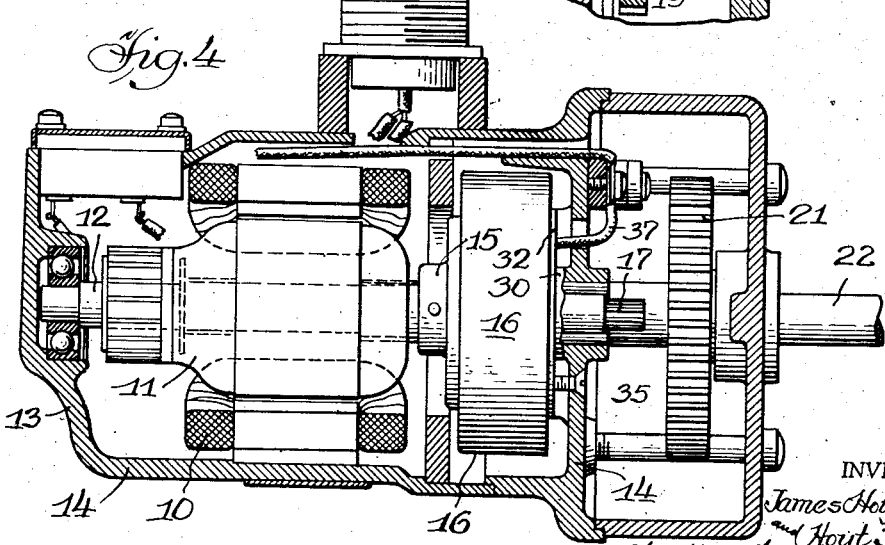

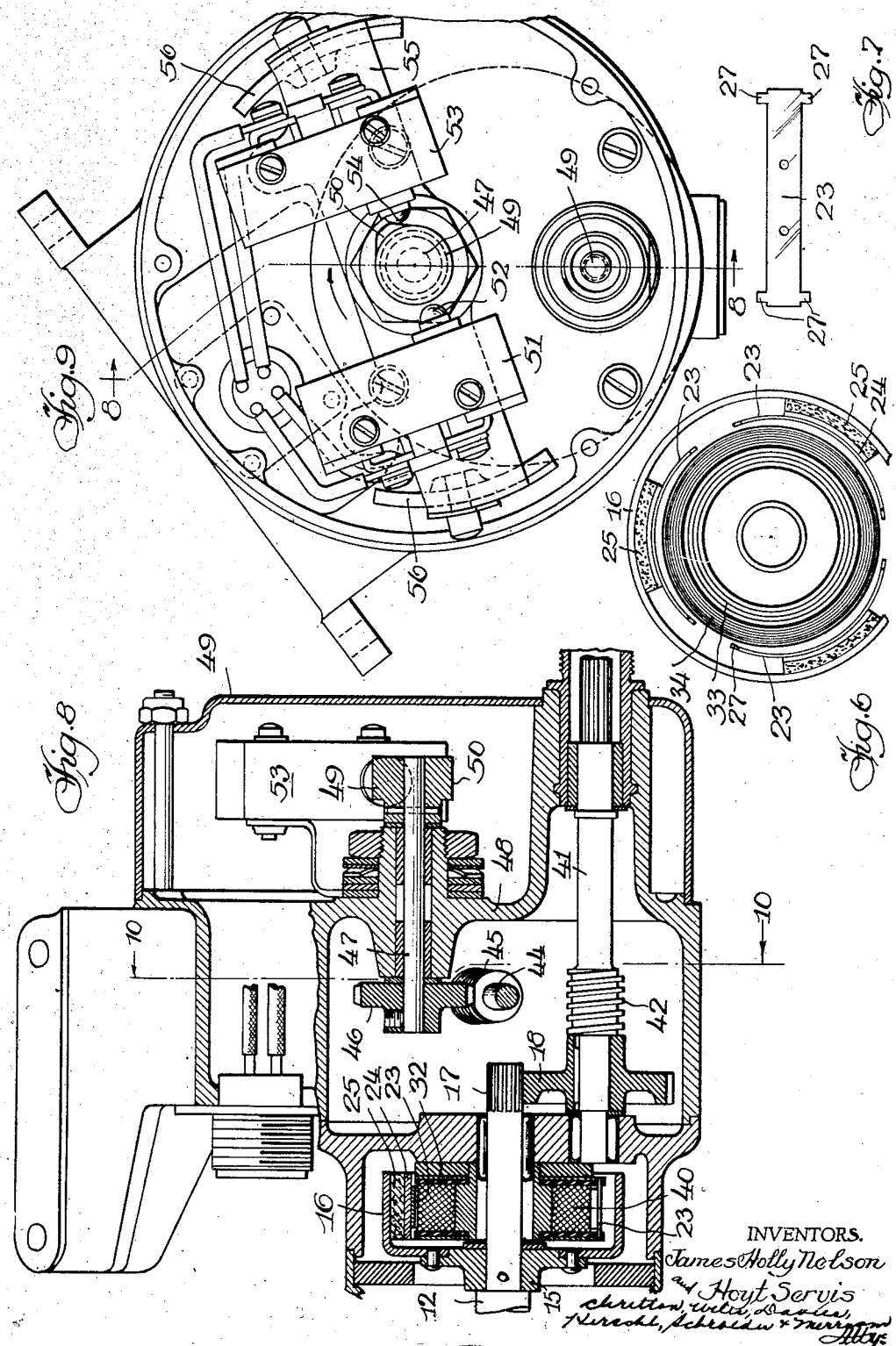

INVENTORS.
James Holly Nelson
Hoyt Jervis

Patented Sept. 25, 1945

2,385,459

UNITED STATES PATENT OFFICE 2,385,459

ELECTRIC BRAKE MECHANISM

James Holly Nelson and Hoyt Servis, Racine, Wis., assignors to The Dumore Company, Racine, Wis., a corporation of Wisconsin Application March 29, 1943, Serial No. 480,966

5 Claims. (Cl. 188—172)

This invention relates to improvements in electric brake mechanism.

One object of the invention is to provide motor driven mechanism and braking mechanism by means of which the opening or closing of cowl flaps may be stopped abruptly and the parts held in adjusted position.

Another object is to provide improved braking mechanism of the internal expanding type, in which the brakes are normally effective when the motor is at rest, and are released whenever the motor is operating.

A further object is to provide a braking mechanism in which the parts are readily assembled, and in which the brake shoes are self-aligning when braking occurs.

An additional object is to provide braking mechanism in which the braking members have a wedging action to effectively stop the rotation of the parts regardless of the direction of rotation.

Other objects and advantages will be apparent from the more detailed description hereinafter given.

In the accompanying drawings the braking device is shown applied to mechanism for opening and closing the cowl flaps and certain other flaps on airplanes, although the mechanism is useful in numerous other fields of service.

Fig. 1 is a central section through the brake drum;

Fig. 2 is a section partly in elevation on line 2—2 of Fig. 3;

Fig. 3 is a side view of said brake drum;

Fig. 4 is a central sectional elevation through the motor housing;

Fig. 5 is an enlarged section of the gear reduction on a plane at right angles to the plane of Fig. 4;

Fig. 6 is an elevation, somewhat diagrammatical, of the braking device;

Fig. 7 is a plan view of a spring member;

Fig. 8 is a sectional elevation of a modified brake assembly;

Fig. 9 is an end view of the same with the end plate removed;

Figure 10:
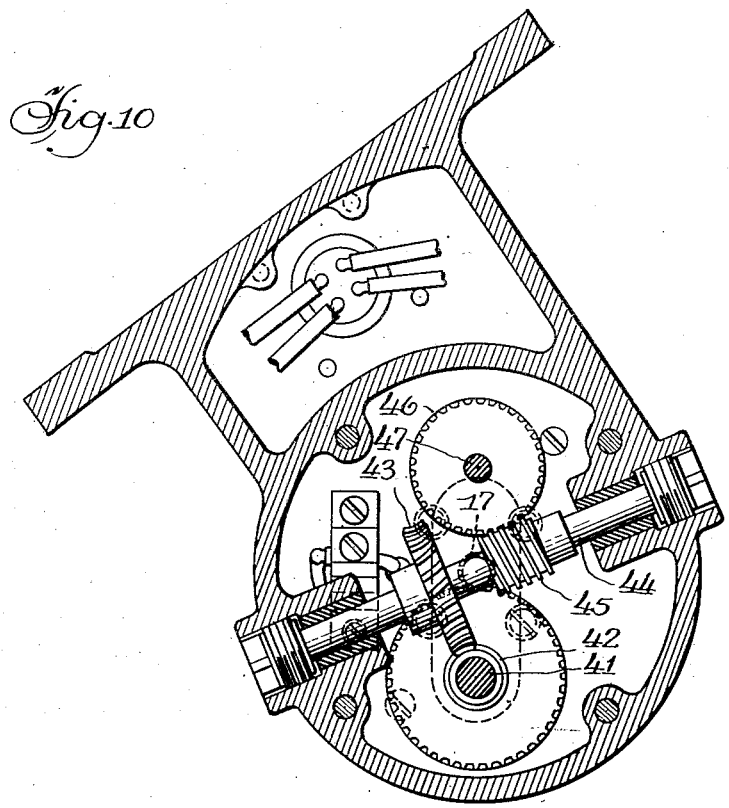
Fig. 10 is a section on the line 10—10 of Fig. 8.

The assembly shown in Fig. 4 includes a motor having field windings 10 and an armature 11 mounted on a shaft 12 supported in suitable bearings in the end wall of the housing 13 at one end and in the transverse wall 14 near the other end. Said shaft has a nonmagnetic brake drum hub 15 mounted thereon to turn therewith, which carries a steel brake drum 16. Said shaft has also a reduced extension with teeth thereon forming a pinion 17.

As shown in Fig. 5, the pinion 17 meshes with a gear 18, the latter being mounted on a countershaft 19 having pinion teeth 20 thereon meshing with the gear 21, the latter being fixed to the extension shaft 22 projecting from the housing, which in turn is connected directly or indirectly to the part to be operated.

The brake drum, shown on a somewhat larger scale in Figs. 1, 2 and 3, has electrically controlled nonrotatable braking members of the expanding type mounted within its cylindrical portion. When the motor is running the brake shoes are held in ineffective or inoperative position by electrical means, and when the motor current is shut off the braking takes place mechanically and almost instantly.

In the preferred form of braking mechanism, as indicated somewhat diagrammatically in Fig. 6, there are provided a plurality of substantially arc-shaped spring members 23, each equipped with a curved armature 24 or magnetic brake shoe, and an overlying brake shoe lining or friction pad 25 made preferably of cork. These three parts may be held together by rivets 26. Said springs have lugs or ears 27 near opposite ends as shown in Fig. 7, which lugs are received loosely within notches or recesses between the projections or teeth 28 on the periphery of the magnetic frame 29 of the spool type which forms part of the electromagnet. The center of the spool comprises a ring 30 having reduced extensions with spaced disks 31 thereon of so-called magnetic iron, between which are positioned washers of insulating material 32. A current coil 33 and a potential coil 34 are mounted on said spool, the construction of the latter being such as to permit of quick assembling. A mounting plate or disk 35 of nonmagnetic material is also mounted on the side of the ring 30 and prevents rotation of the latter, being held against rotation by screws 36 passing through the partition 14, as shown in Fig. 4. Conductors 37 connect the electromagnet with the motor circuit, as hereinafter described. The brake drum and the electromagnet are relatively rotatable, the electromagnet being stationary in this instance.

The armatures 24 are drawn inwardly when the magnet is energized. The curved spring members 23 have normally a smaller radius than the adjacent cylindrical outer surface of the coil 34, and hence they tend to assume the position shown in Fig. 6 when the coils are de-energized. In this position the brake shoes frictionally grip the inner wall of the brake drum 16 and are very effective in stopping rotation in either direction, due to the wedging action made possible by the spring mounting. When the coil or coils 33, 34 are energized, said armatures are drawn radially inward, flattening out the springs somewhat and releasing the frictional braking members from the brake drum. The ears 27 near the ends of the springs have enough play in the notches to permit of said partial flattening.

Among other advantages of the construction described, it may be noted that the curved springs and the brake shoes are so constructed that a ready assembly of these parts is made possible and they will not fall out of place. The brake shoes are self-aligned on the brake drum when the braking action occurs. The springs and the brake shoes brake equally well for either direction of rotation and have a wedging action both ways. The spool type magnetic frame and the coil or coils thereon are easily assembled. The design is such as to make it easy to mount on the spool either differential coils such as described, or a single series coil, or a single shunt coil.

The effort required initially to open the cowl flaps of an airplane represents the maximum load, whereas in partially open position there is practically no load and in fully open position there is a maximum load. Where the magnetic brake is equipped with two coils, the current coil is in series with the motor and the potential coil is connected across the motor brushes. With this arrangement the motor starts with a maximum torque and the coils are very effective to withdraw the brake shoes, due to the fact that the motor armature offers very little counter-electromotive force, and to the resulting strong energization of the series coil, with practically no energization of the potential coil. The series coil is used not only to pull the brake shoes radially inward, but also it helps to hold them when the motor is running under heavy load, at which time the potential coil is also effective. Under no-load conditions, when the flaps are about half open, the current through the motor is low and the series coil has very little energization, but the potential across the brushes is high because the motor is running at high speed, so the potential coil is highly energized.

The equipment as a whole is also small, compact, efficient in operation and fairly light.

In the form of equipment illustrated in Figures 8 and 9, the motor and its housing may be assumed to be the same as that shown in Fig. 4 and previously described. The braking mechanism is also the same as that previously described, and some of the same reference characters have been used to indicate corresponding parts. The magnetic winding 40 in this case, however, consists of a single current coil. The shaft 41, driven from the armature shaft by the reduction gearing, has worm teeth 42 thereon, which drive a worm gear mounted on a shaft 44 (shown in part only) and carrying an additional worm gear 45 which rotates the gear 46 mounted on a shaft 47, the latter being supported in the wall 48 of the housing. The end of the shaft projects into a compartment which is closed by the removable wall 49. In this compartment the switches are located which limit the operation of the motor, as, for example, where it is desired to move the cowl flaps only a certain amount.

The shaft 41 also projects through the housing, and constitutes the output shaft which is adapted to drive whatever mechanism is to be actuated by the motor, as, for example, said cowl flaps.

Fig. 9 is an end view of the housing shown in Fig. 8, but with the cover plate 49 removed. The shaft 47 has a cam 50 mounted thereon. When the motor rotates in one direction, said cam during its rotation actuates a switch in a switch housing 51, by depressing the push button 52 therein. When said cam turns in the opposite direction, it actuates the corresponding switch in the switch housing 53 by depressing its push button 54. Said switch housings 51 and 53 have supporting frames 55 which are adjustable on supports 56. Each switch is connected in a relay circuit (not shown) and is normally closed. When the push button is depressed the circuit is opened, permitting the relay to open the motor circuit and stop the motor. Somewhat later the operator closes the motor circuit, causing the motor to rotate in the opposite direction.

Figure 11:
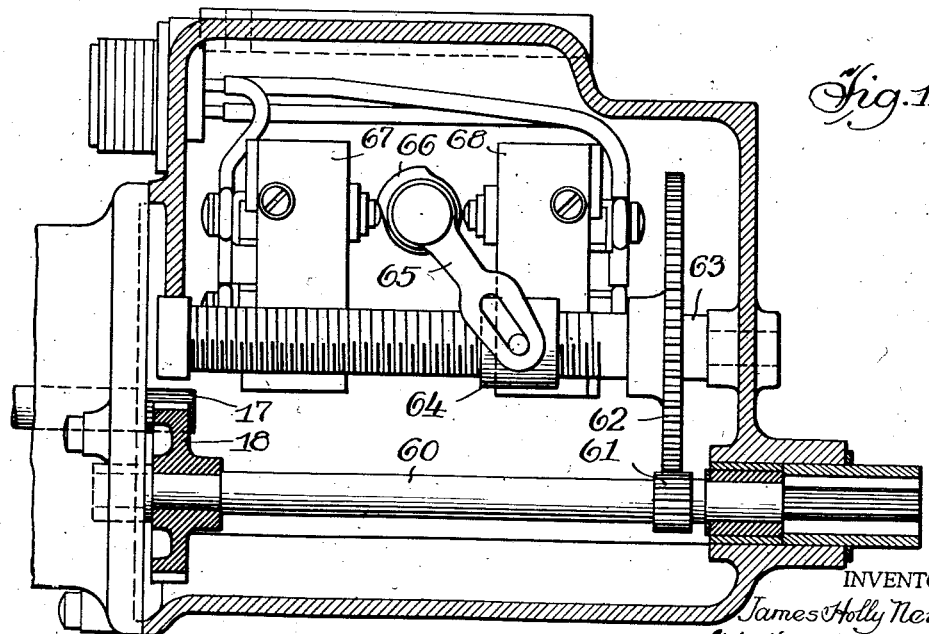
Fig. 11 is a section of another modification.

A further modification of the mechanism for actuating the limit switches is shown in Fig. 11. In this figure the motor may be assumed to be the same as that previously described, and the brake mechanism may have either one or two coils, as shown in Fig. 8 or Fig. 4. The shaft 60 has reduction gearing 61, 62 thereon, which rotates the threaded shaft 63, causing the nut 64 to travel to the left or right, as viewed in this figure, depending on the direction of rotation. This travel of the nut rocks the lever 65 and also the cam 66, which actuates the switches in the housings 67, 68 in the manner previously described.

We claim:

1. In combination, a cylindrical brake drum, a shaft to which said brake drum is affixed, an electromagnet arranged concentrically around said shaft, a plurality of arc-shaped springs surrounding said electromagnet and having a radius less than that of the outer surface of said electromagnet, the ends of said springs resting on said electromagnet with the convex sides facing outwardly, armatures secured to said convex sides, and friction material mounted on the outer surfaces of said armatures whereby said springs normally press said friction material against the inner surface of said drum and whereby energization of said electromagnetic winding tends to flatten said springs and relieve said frictional engagement, said electromagnetic winding and said shaft being relatively rotatable.

2. In combination, a shaft, a hub of nonmagnetic material affixed thereto, a cylindrical brake drum secured to said hub, a spool having notched side walls and having a magnet coil thereon, a series of curved springs having lateral projections received loosely within said notches and arched away from said electromagnetic coil, armatures secured to said springs, and friction material secured to said armatures and normally held in engagement with said drum by said springs, whereby energization of said magnet coil draws said armatures radially inward and releases said friction material.

3. The combination with a motor having a housing and an armature shaft mounted therein, of a brake drum affixed to said shaft to rotate therewith, a stationary electromagnet comprising a core surrounding said shaft, a winding thereon and notched side walls confining said winding, arc-shaped springs having lateral extensions received loosely within said notches, arc-shaped lengths of magnetic material secured to said springs whereby they may be moved radially inwardly or outwardly as said springs flex, and brake shoes mounted on said armatures, said winding being in the motor circuit whereby when said circuit is closed to start the motor said armatures are drawn inwardly to release said brake shoes and whereby when the motor circuit is opened the braking action is applied immediately by said springs.

4. Electric brake mechanism comprising a ring-shaped electromagnet having peripheral seats, a plurality of leaf springs disposed around the periphery of said electromagnet, said springs having end projections received loosely within said seats to permit each spring to lengthen but preventing substantial peripheral displacement thereof, and each spring being curved to an arc of less radius than the radius of said periphery and with its concave side facing inwardly, an armature secured to the central portion of each of said arc-shaped springs to be drawn inwardly when said electromagnet is energized and thus to partially flatten said springs, a brake drum surrounding said springs, and a brake shoe between each of said springs and said brake drum and normally spring pressed against the inner surface of said drum when said electromagnet is de-energized, to provide a braking action.

5. A cylindrical brake drum having a concentric electromagnet therein, said electromagnet comprising a metal spool including side circular flanges, a coil between said flanges, a plurality of arc-shaped resilient members surrounding said coil, and of a width to span and rest on said flanges, and having a radius less than that of said flanges, whereby energization of said coil will draw said resilient members inwardly away from said brake drum, said flanges serving as stops to limit said inward movement, and friction material interposed between said resilient members and said drum.

JAMES HOLLY NELSON.
HOYT SERVIS.